United States Patent [19]

Okumura

[11] Patent Number: 5,117,694
[45] Date of Patent: * Jun. 2, 1992

[54] MEASURED OBJECT SUPPORT MECHANISM FOR UNBALANCE MEASURING APPARATUS

[75] Inventor: Hiromitu Okumura, Osaka, Japan

[73] Assignee: Denshi Seiki Kogyo Kabushiki Kaisha, Osaka, Japan

[*] Notice: The portion of the term of this patent subsequent to Jan. 1, 2008 has been disclaimed.

[21] Appl. No.: 606,269

[22] Filed: Oct. 31, 1990

Related U.S. Application Data

[62] Division of Ser. No. 322,463, Mar. 13, 1989, Pat. No. 4,981,043.

[30] Foreign Application Priority Data

Apr. 22, 1988 [JP] Japan .................................. 63-54696

[51] Int. Cl.⁵ ............................................. G01M 1/02
[52] U.S. Cl. ................................................. 73/462
[58] Field of Search ........................... 73/460, 462, 660

[56] References Cited

U.S. PATENT DOCUMENTS 4,507,964 4/1985 Borner et al. ......................... 73/462

Primary Examiner—John E. Chapman
Attorney, Agent, or Firm—Edwin E. Greigg; Ronald E. Greigg

[57] ABSTRACT

A measured object support mechanism for use in an unbalance measuring apparatus for detecting vibrations resulting from rotation of a measured object supported by a measured object supporting member and measuring an unbalance of the measured object. This support mechanism comprises a slidable supporting device disposed between a base block supporting the unbalance measuring apparatus and the measured object supporting member.

4 Claims, 5 Drawing Sheets

MEASURED OBJECT SUPPORT MECHANISM FOR UNBALANCE MEASURING APPARATUS

This is a divisional of copending application Ser. No. 07/322,463 filed on Mar. 13, 1989, now U.S. Pat. No. 4,981,043.

BACKGROUND OF THE INVENTION (1) Field of the Invention

The present invention relates to a measured object support mechanism for unbalance measuring apparatus, which is used for measuring positions and amounts of and correcting and shaping unbalance points of rotatable objects such as a rotor of an electric motor, a fan, a rotary shaft and the like which require a good rotational balance.

(2) Description of the Prior Art

A measured object support mechanism used in the known unbalance measuring apparatus, as shown in FIG. 8, has the bearing 117 rotatably supporting a shaft of the measured object 116. The bearing 117 is secured to the oscillatable horizontal member 118.

The oscillatable member 118 is supported at opposite ends thereof by plate springs A to be oscillatable right and left. The vibration sensor 115 is supported as sandwiched between one of the plate springs A and a base block B.

The plate springs A are urged toward the vibration sensor 115 to hold the vibration sensor 115 against downward slipping.

The known measured object support mechanism used in the unbalance measuring apparatus does not allow high precision measurement since slight vibration energy is absorbed by the plate springs supporting the oscillatable member.

There is the further problem that resonance of the plate springs and associated elements and distortion of the plate springs per se obstruct accurate unbalance measurement.

SUMMARY OF THE INVENTION

The object of the present invention, therefore, is to provide a measured object support mechanism which overcomes the various disadvantages of the prior art noted above.

In order to achieve this object, the present invention provides a measured object support mechanism for use in an unbalance measuring apparatus for causing sensor means to detect vibrations resulting from rotation of a measured object supported by a measured object supporting member and measuring an unbalance of the object. This support mechanism comprises a slidable supporting device disposed between a base block supporting the unbalance measuring apparatus and the measured object supporting member.

The support mechanism may comprise a supporting device including bearings.

The support mechanism may comprise a floating type supporting device utilizing magnetic repulsion.

Further, the support mechanism may comprise a floating type supporting device including a fluid layer disposed between the base block supporting the unbalance measuring apparatus and the measured object supporting member.

The measured object support mechanism according to the present invention comprises a slidable supporting device disposed between a base block supporting the unbalance measuring apparatus and a measured object supporting member. In this construction, no elastic resistance occurs in horizontal directions, and even slight vibrations are detected without being attenuated.

Where the supporting device includes bearings, horizontal frictional resistance is minimized, and even slight vibrations are detected without being attenuated.

Where the support mechanism comprises a floating type supporting device employing magnetic repulsion, the horizontal frictional resistance is further reduced, and even slight vibrations are detected without being attenuated.

Also where the supporting device includes a fluid layer between the measured object supporting member and the base block, the horizontal frictional resistance is minimized, and even slight vibrations are detected without being attenuated.

The measured object support mechanism according to the present invention comprises a slidable supporting device disposed between a base block supporting the unbalance measuring apparatus and a measured object supporting member. In this construction, there occurs no resistance to horizontal vibrations, and even slight vibrations are detected without being attenuated. This feature enables high precision measurement. The feature that the supporting device does not rely on elastic elements such as springs has the advantage of involving no distortion.

Where the supporting device includes the bearings, the mechanism is capable of withstanding the load of the measured object while minimizing the horizontal frictional resistance. This construction has the advantage of providing an unbalance point positioning apparatus operable with high precision and a high degree of reliability.

Where the support mechanism comprises the floating type device employing magnetic repulsion, the unbalance point positioning will be operable with even higher precision.

The supporting device including a fluid layer between the measured object support and the base block also provides a high precision unbalance point positioning apparatus.

Other features and advantages of the present invention will be apparent from the following description.

BRIEF DESCRIPTION OF THE DRAWINGS

The drawings show an embodiment of a measured object support mechanism for unbalance measuring apparatus according to the present invention, in which.

DESCRIPTION OF THE PREFERRED EMBODIMENT

A measured object support mechanism according to the present invention will be described in detail hereinafter with reference to the drawings.

Figure 1:
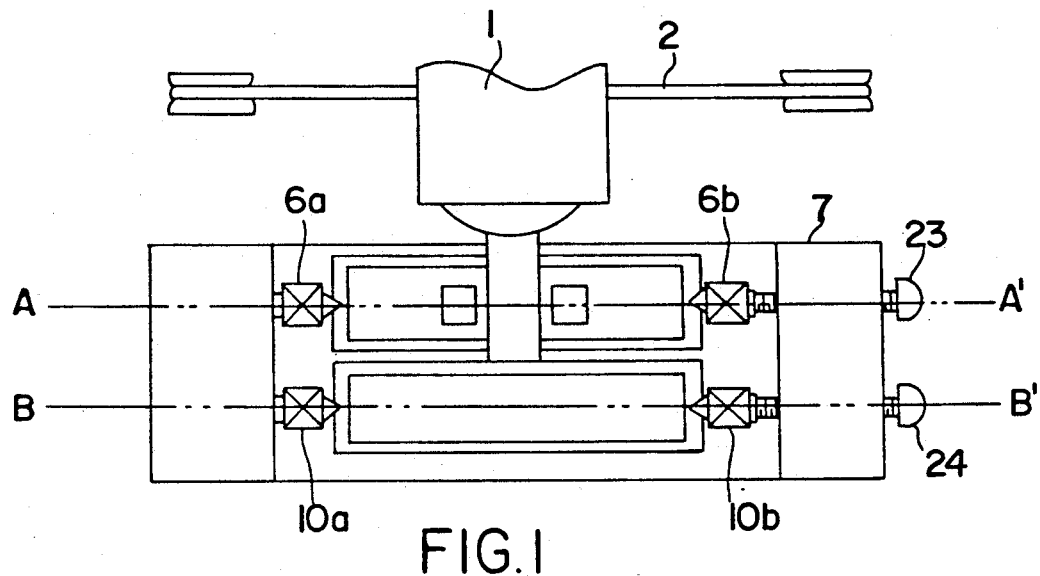
FIG. 1 is a plan view of an unbalance signal detecting device used in an unbalance measuring apparatus.
Figure 2:
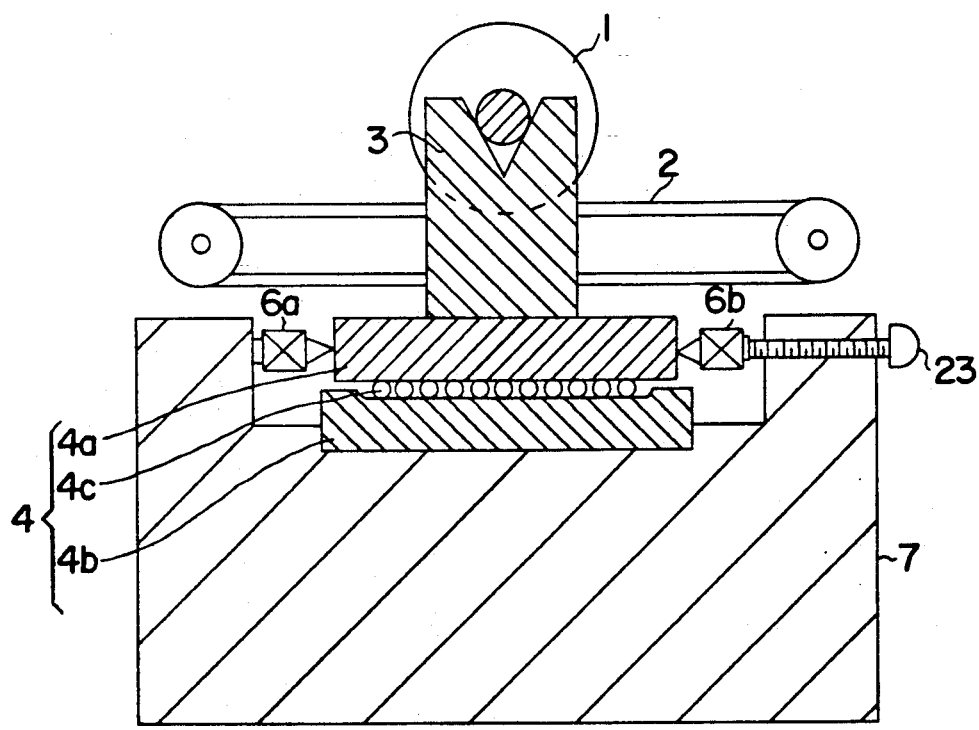
FIG. 2 is a section taken on line A-A' of FIG. 1.
Figure 3:
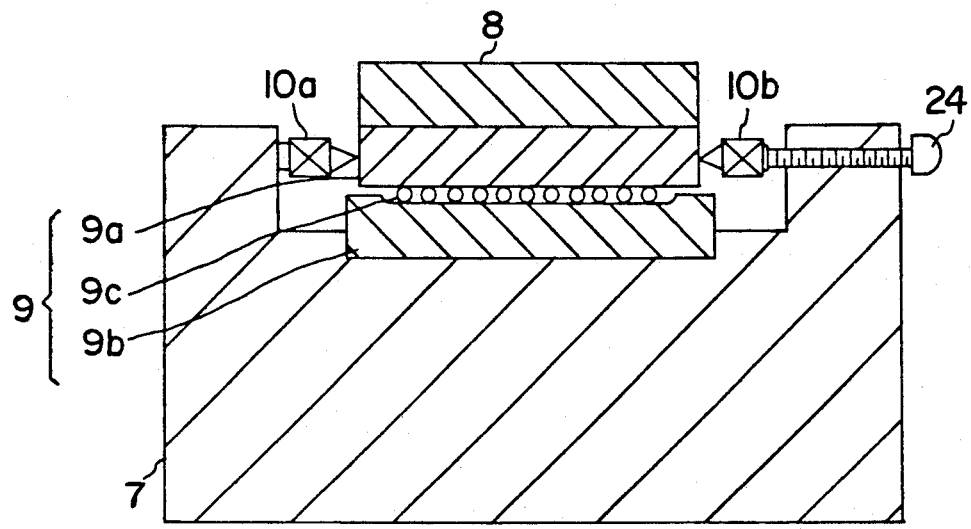
FIG. 3 is a section taken on line B-B' of FIG. 1.
Figure 4:
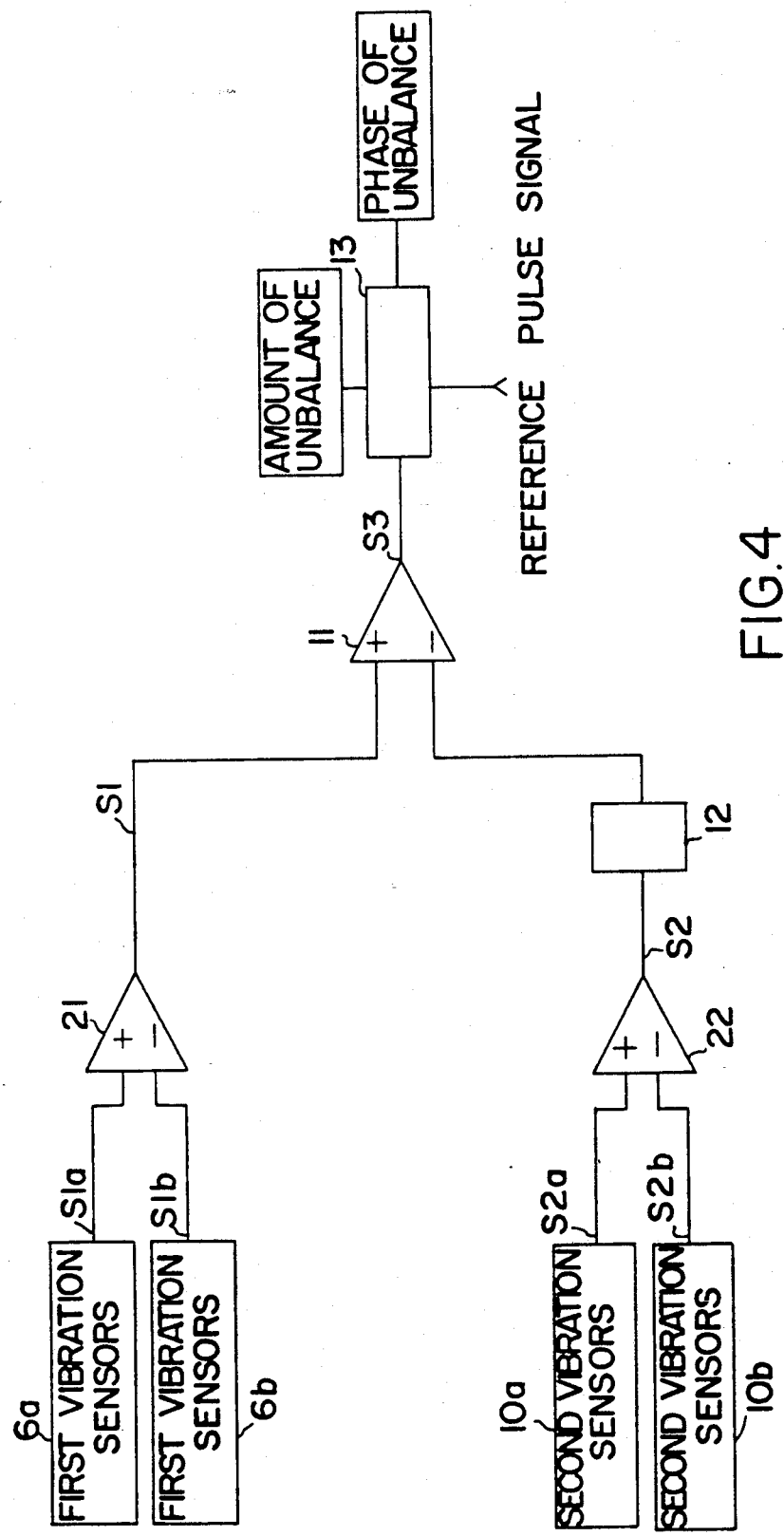
FIG. 4 is a block diagram of a principal portion of the unbalance signal detecting device.

FIG. 1 is a plan view of an unbalance signal detecting device used in the unbalance measuring apparatus. FIG. 2 is a section taken on line A-A' of FIG. 1. FIG. 3 is a section taken on line B-B' of FIG. 1. FIG. 4 is a block diagram of a principal portion of the unbalance signal detecting device.

Referring to FIGS. 1 and 2, the measured object comprises a rotor 1 of an electric motor rotatable by a drive belt 2. The rotor 1 is supported by a bearing 3 which transmits horizontal vibrations produced by the rotor 1 in high-rate rotation to first vibration sensors 6a and 6b through a movable plate 4a of a supporting device 4.

High sensitivity is achieved by differentiating the two first vibration sensors 6a and 6b.

Number 7 indicates a base block securely supporting a stationary plate 4b of the supporting device 4 and proximal ends of the first vibration sensors 6a and 6b.

The first vibration sensors 6a and 6b detect composite vibrations consisting of vibrations due to the unbalance of the measured object 1 and vibrations of the base block 7 due to external vibrations.

The supporting device 4 further includes a plurality of bearings 4c arranged between a bottom surface of the movable plate 4a and a top surface of the stationary plate 4b, to reduce sliding friction.

Referring to FIGS. 1 and 3, number 8 indicates a dummy load having approximately the same weight as the rotor 1. As is the movable plate 4a, the dummy load 8 is supported by a supporting device 9.

Numbers 10a and 10b indicate second vibration sensors each sandwiched between the dummy load 8 standing still by inertia and the base block 7 which vibrates with external vibrations. The second vibration sensors 10a and 10b are operable to detect the external vibrations.

High sensitivity is achieved by differentiating the two second vibration sensors 10a and 10b.

Adjustable bolts 23 and 24 are provided to hold the first vibration sensors 6a and 6b and the second vibration sensors 10a and 10b against downward slipping, respectively.

Referring to FIG. 4, the first vibration sensors 6a and 6b output composite signals S1a and S1b including a signal resulting from the rotation of an unbalance point of the rotor 1 and a noise signal due to the external vibrations, respectively.

On the other hand, the second vibration sensors 10a and 10b output signals S2a and S2b each consisting only of a noise signal due to the external vibrations.

The signal S1a and S1b are subjected to differential amplification at a differential amplifier 21 to produce a composite signal S1. The signals S2a and S2b are subjected to differential amplification at a differential amplifier 22 to produce a noise signal S2. The composite signal S1 and noise signal S2 are input to a subtracter circuit 11 where the noise signal S2 is subtracted from the composite signal S1, thereby to produce an unbalance signal S3. Prior to input to the subtracter circuit 11, the noise signal S2 passes through a ratio circuit 12 where the noise signal S2 is multiplied by a predetermined constant. At the same time, amplitude and phase adjustments are effected such that noise components of the composite signal S1 and noise signal S2 cancel each other. As a result, the unbalance signal S3 produced from the subtracter circuit 11 comprises a signal indicative of the vibration due to the unbalance point only.

The unbalance signal S3 is input to an unbalance measuring circuit 13 which derives an amount of unbalance from a vibration component of the unbalance signal S3, and a phase of the unbalance point from a phase component of the unbalance signal S3 and the phase of a reference pulse signal.

Thus the unbalance signal detecting device accurately obtains the amount and phase of unbalance of the rotor or measured object 1.

To remove the noise signal from the unbalance signal S3, the ratio circuit 12 is adjusted such that the unbalance signal S3 is at a minimum level when the rotor 1 stands still. Then, when the rotor 1 is rotated at high speed by the drive belt 2, the noise signal contained in the unbalance signal S3 is minimized.

Figure 5:
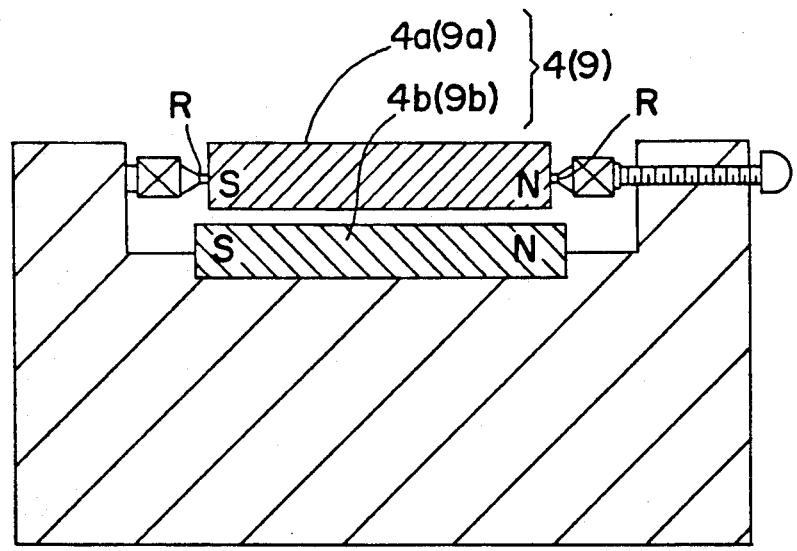
FIG. 5 is a sectional view of a floating support mechanism utilizing magnetic repulsion.

The noise signal may be removed from the unbalance signal S3 by determining a subtracting ratio between the signal S1 and signal S2 through calculation and comparision between inertial mass and moment of inertia of the rotor 1, bearing 3 and movable plate 4 in FIGS. 4 and 5 and those of the dummy load 8.

As described above, for detecting horizontal vibrations of the rotor 1 and dummy load 8, the supporting devices 4 and 9 support vertical loads in a manner to reduce resistance to the horizontal vibrations and allow free movements. Consequently, a slight kinetic energy acting horizontally is not readily absorbed, which allows the vibrations to be detected with high precision.

The supporting device including the bearings may be replaced with a supporting device as shown in FIG. 5. This supporting device 4 has a movable plate 4a defining magnetic poles in the bottom surface thereof, and a stationary plate 4b defining magnetic poles in the top surface thereof. Like poles are opposed to each other to render the two surfaces mutually repulsive, thereby to form a narrow space therebetween.

In addition, the stationary plate 4b may be extended to define projections above the top surface of the movable plate 4a, with like magnetic poles defined in the top surface of the movable plate 4a and lower surfaces of the projections to be mutually repulsive. This construction will be effective to restrict vertical displacement of the movable plate 4a.

The first vibration sensors 6a and 6b and the second vibration sensors 10a and 10b include small rollers R at positions contacting the movable plates 4a and 9a, respectively. This construction renders the vibration sensors less vulnerable to influences of vertical movement of the movable plates 4a and 9a.

In this construction, the movable plate 4a and stationary plate 4b are not in direct contact with each other, whereby there occurs almost no frictional resistance therebetween.

As a result, slight kinetic energy acting horizontally is not attenuated to allow a high precision detection of vibrations.

Figure 6:
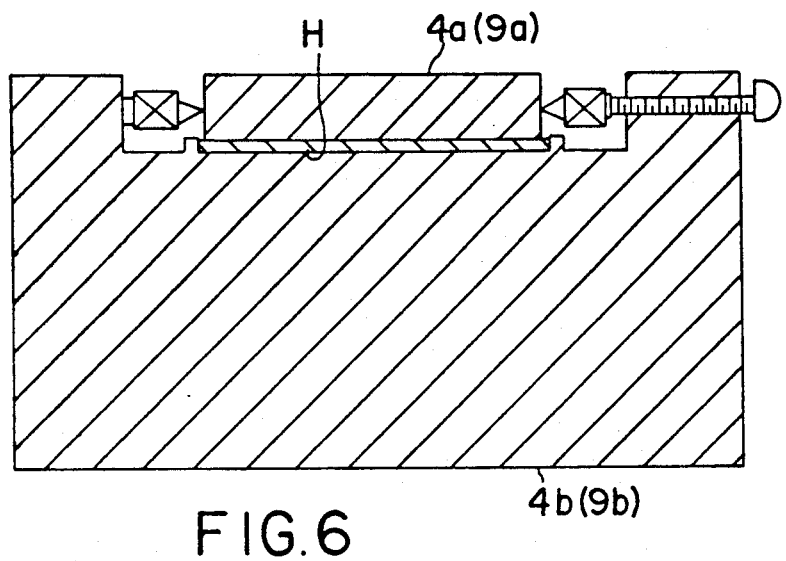
FIGS. 6 and 7 are sectional views of support mechanisms including a fluid layer, respectively.

As shown in FIG. 6, the supporting device 4 may include a layer of liquid H such as lubricating oil between the bottom surface of the movable plate 4a and the top surface of the stationary plate 4b, to form a narrow space therebetween.

Figure 7:
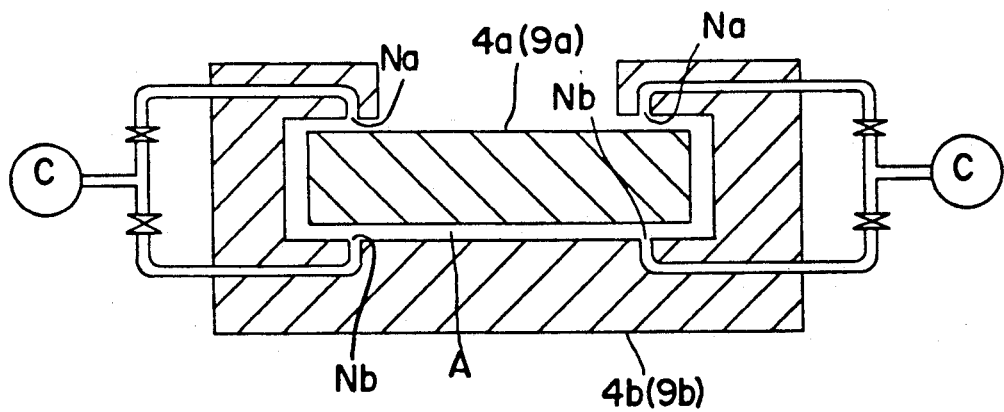
Figure 8:
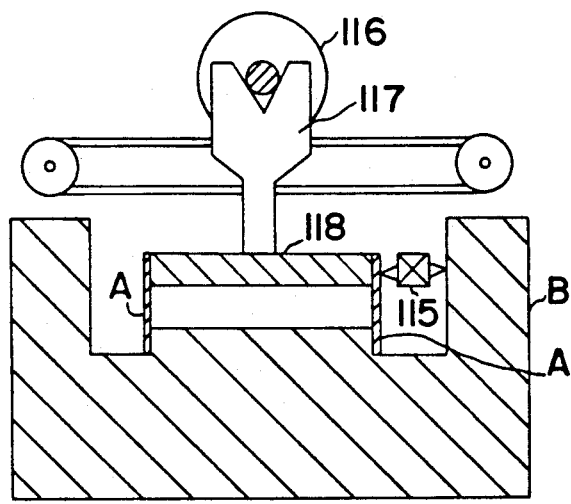
FIG. 8 is a sectional view of a principal portion of an unbalance signal detecting device known in the art.

Further, as shown in FIG. 7, the liquid layer H may be replaced with a different fluid layer A such as of air or other gas or of oil or other liquid which is continuously supplied through upper nozzles Na and lower nozzles Nb.

In these constructions too, the movable plate 4a and stationary plate 4b are out of contact with each other and almost no frictional resistance occurs therebetween.

Thus, the present invention has various advantages over the conventional support mechanism including plate springs, in that the present invention is free from distortion of the detection signal due to resonace of the plate springs and associated elements, distortion of the plate springs per se, and the necessity to deform springs to allow vibrations.

In the present invention, the slight kinetic energy acting horizontally is not attenuated, there occurs no distortion, vibrations are detected with high precision, the unbalance measurement is made with high precision, and the positioning precision is improved.

Where the supporting device includes the bearings, the device is capable of withstanding the load of the measure object while minimizing the horizontal frictional resistance. This construction has the advantage of providing an unbalance point positioning apparatus operable with high precision and a high degree of reliability.

Where the supporting device comprises the floating type employing magnetic repulsion, the unbalance point positioning will be operable with even higher precision.

The supporting device including a fluid layer between the measured object support and the base block also provides a high precision unbalance point positioning apparatus.

What is claimed is:

1. An unbalance signal detecting apparatus for use with a measured object support mechanism in an unbalance measuring apparatus that detects vibrations resulting from rotation of a measured object supported by said measured object support mechanism and measures an unbalance of the measured object, said unbalance signal detecting apparatus comprising:

first vibration detecting means for detecting composite vibrations of unbalance vibrations between said measured object support mechanism and a base (7) resulting from revolution of an unbalanced measured object and external vibrations transmitted to said base (7), second vibration detecting means for detecting the external vibrations between a dummy weight (8) and said base (7), and computing means for processing signals provided by said first vibration detecting means and said second vibration detecting means to cancel signal components due to the external vibrations thereby to obtain an unbalance signal reflecting the unbalance vibrations only.

2. An unbalance signal detecting apparatus as set forth in claim 1, in which said first vibration detecting means includes a first vibration sensor (6a) and a second vibration sensor (6b) wherein a signal (S1a) output from said first vibration sensor and a signal (S1b) output from said second vibration sensor is directed to a differential amplifier (21) to produce a composite signal output (S1) which is directed as an input to a subtractor (11) for subtraction from the signal from the second vibration detecting means.

3. An unbalance signal detecting apparatus as set forth in claim 1, in which said second vibration detecting means includes a first vibration sensor (10a) and a second vibration sensor (10b) wherein a signal (S2a) output from said first vibration sensor and a signal (S2b) output from said second vibration sensor are directed to a differential amplifier (22) to produce a noise signal (S2) which is adjusted by a ratio circuit (12) and directed to a subtractor (11) for subtraction from the signal from the first vibration detecting means.

4. An unbalance signal detecting apparatus as set forth in claim 1, in which said first vibration detecting means includes a first vibration sensor (6a) and a second vibration sensor (6b) wherein a signal (S1a) output from said first vibration sensor and signal (S1b) output from said second vibration sensor are directed to a differential amplifier (21) to produce a composite signal output (S1) which is directed as an input to a subtractor (11) for further processing, and in which said second vibration detecting means includes a third vibration sensor (10a) and a fourth vibration sensor (10b) wherein a signal (S2a) output from said third vibration sensor and a signal (S2b) output from said fourth vibration sensor are direction to a differential amplifier (22) to produce a noise signal (S2) which is adjusted by a ratio circuit (12) and directed to the subtractor (11) for further processing, whereby said noise signal is subtracted from the composite signal (S1) thereby producing an unbalance signal (S3).

* * * * *